United States Patent [19]

Focke

[11] Patent Number: 4,830,170
[45] Date of Patent: May 16, 1989

[54] PROCESS AND APPARATUS FOR FEEDING PACKS TO A COLLECTING AND PACKAGING STATION

[75] Inventor: Heinz Focke, Verden, Fed. Rep. of Germany

[73] Assignee: Focke & Co., Verden, Fed. Rep. of Germany

[21] Appl. No.: 125,742

[22] Filed: Nov. 13, 1987

Related U.S. Application Data

[63] Continuation of Ser. No. 814,946, Dec. 31, 1985, abandoned.

[30] Foreign Application Priority Data

Jan. 17, 1985 [DE] Fed. Rep. of Germany ....... 3501404

[51] Int. Cl.⁴ .............................................. B65G 1/00
[52] U.S. Cl. .................................... 198/347; 198/433
[58] Field of Search .............. 198/347, 427, 429, 485, 198/614, 435, 472, 345, 460, 461, 577, 433, 809; 414/331, 536, 277, 278, 280, 285, 787, 786

[56] References Cited

U.S. PATENT DOCUMENTS

| | | | |
|---|---|---|---|
| 3,499,555 | 3/1970 | Wahle | 198/347 |
| 3,934,707 | 1/1976 | Bowman | 198/460 |
| 3,951,254 | 4/1976 | Jahrend | 198/809 |
| 4,609,091 | 9/1986 | Dorner | 198/347 |

FOREIGN PATENT DOCUMENTS

| | | |
|---|---|---|
| 2505451 | 8/1976 | Fed. Rep. of Germany . |
| 2644240 | 4/1977 | Fed. Rep. of Germany . |
| 2702219 | 7/1978 | Fed. Rep. of Germany . |
| 2727638 | 12/1978 | Fed. Rep. of Germany . |
| 3046154 | 7/1982 | Fed. Rep. of Germany . |

*Primary Examiner*—James B. Marbert
*Attorney, Agent, or Firm*—Sughrue, Mion, Zinn, Macpeak & Seas

[57] ABSTRACT

The feeding of articles, especially (small) packs (10), to a processing station, especially a collecting and packaging station (21), can be temporarily be interrupted as a result of faults in the region of the latter. To prevent damage to the packs (10) because the pack conveyor (11) continues to run, a number of packs (10), in particular a build-up series (27), is temporarily lifted off the pack conveyor (11). The following packs (10) are fed to a pack store (42) in pack groups (22).

14 Claims, 5 Drawing Sheets

PROCESS AND APPARATUS FOR FEEDING PACKS TO A COLLECTING AND PACKAGING STATION

This is a continuation of application Ser. No. 814,946, filed Dec. 31, 1985, now abandoned.

BACKGROUND OF THE INVENTION

The invention relates to a process for feeding articles, especially packs, to a processing station, for example a collecting and packaging station, in which process the articles can be fed in a closely arranged series (pack series) to the processing station by a pack conveyor. The invention also relates to an apparatus for carrying out the process.

Bringing together small packs, especially cigarette sticks, and packaging them into large bundles are of primary importance. In this operation, the cigarette sticks, lying transversely on a pack conveyor, are fed to a collecting and packaging station, in which the packs (cigarete sticks) are combined into a group and then pushed into an open folding carton.

In apparatuses of packaging units of the type in question here, temporary faults are unavoidable in practice, particularly in the region of the collecting and packaging station. If the cigarettes are not received and processed by this, there is a build-up of packs (build-up series) on the pack conveyor when the pack conveyor continues to run. The upper side of the pack conveyor, which preferably consists of one or more conveyor belts, slides along on the underside of the stationary packs. If the wrappers are delicate, for example where metallized pack blanks for cigarette sticks are concerned, this results in undesirable markings on the packs (cigarette sticks) or even damage to them.

SUMMARY OF THE INVENTION

The object on which the invention is based is to avoid the abovementioned defects, whilst at the same time maintaining an appropriate work cycle.

To achieve this object, the process according to the invention is characterized in that, in the event of a feed build-up, the drive connection between the articles and the pack conveyor is temporarily broken but the conveyor drive is maintained. Preferably, a number of packs adjacent to the collecting and packaging station, in particular a build-up series, is lifted off from the pack conveyor, until the fault is rectified and the transport of the packs can be continued.

Since, during a temporary interruption, the feeding of packs to the pack conveyor is maintained and the packs are transported by the pack conveyor, a pack store is arranged in the region of the pack conveyor, receives the packs and returns them to the pack series after the interruption has ended. In the present case, the pack store is designed as a vertical store which lifts each of the pack groups off the pack conveyor and conveys them upwards and then downwards into the pack series to return them.

The apparatus according to the invention incorporates at least one pack conveyor, preferably consisting of a single conveyor belt. Assigned to this and adjacent to the collecting and packaging station is a pack lifter, by means of which a number of packs closely arranged next to one another, in particularly a build-up series, can be lifted off the pack conveyor and is held at a short distance above the latter.

Movable stops are assigned to the pack store and to the pack conveyor respectively and can be pivoted into the path of movement of the packs to halt the packs temporarily on the pack conveyor. Monitoring or sensing members (photocells) are assigned to the stops and control the orderly introduction of the packs into the pack store and their return into the pack series on the pack conveyor.

Further details of the invention relate to the constructive design of the pack lifter and of the pack store.

BRIEF DESCRIPTION OF THE DRAWINGS

An exemplary embodiment of the invention is explained below with reference to the drawings. In the drawings.

DETAILED DESCRIPTION OF THE PREFERRED EMBODIMENT

Figure 1:
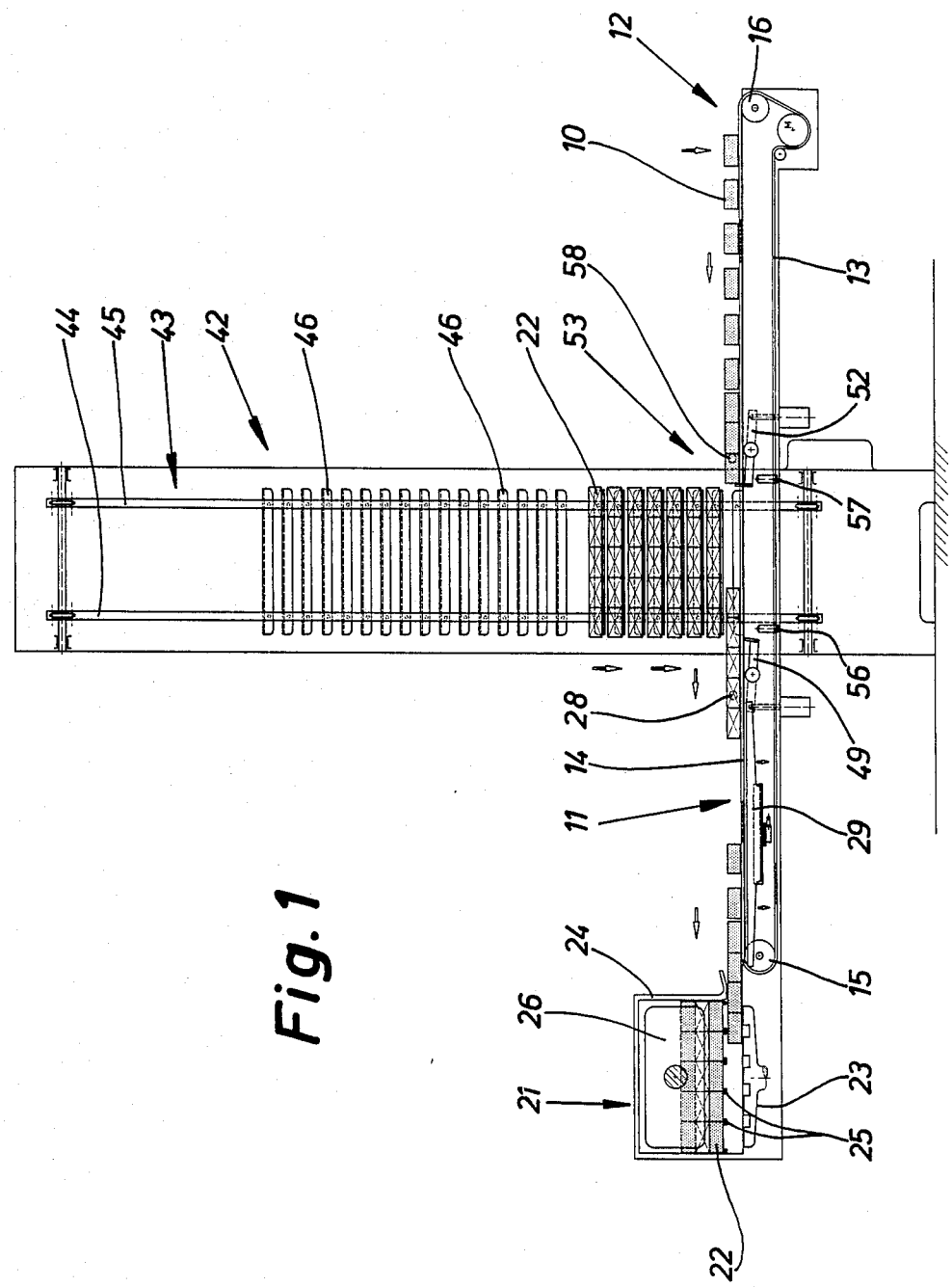
FIG. 1 shows a simplified side view of the apparatus.

The exemplary embodiment illustrated in the drawings relates to the (further) packaging of (small) packs 10, especially cigarette sticks. These are elongate cuboid structures which are received on a pack conveyor 11 transversely, that is to say with their longitudinal extension transverse relative to the conveying direction. The packs 10 are transferred to the pack conveyor 11 in the region of a feed station 12, specifically coming from an appropriate preceding packaging machine.

Figure 5:
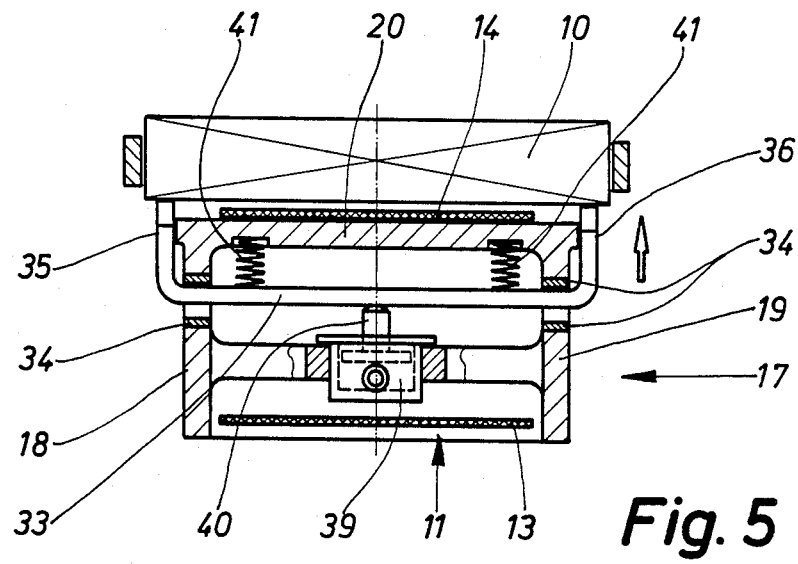
FIG. 5 shows a cross-section through the apparatus in the plane VI—VI of FIG. 3, with the packs lifted off (build-up series)
Figure 6:
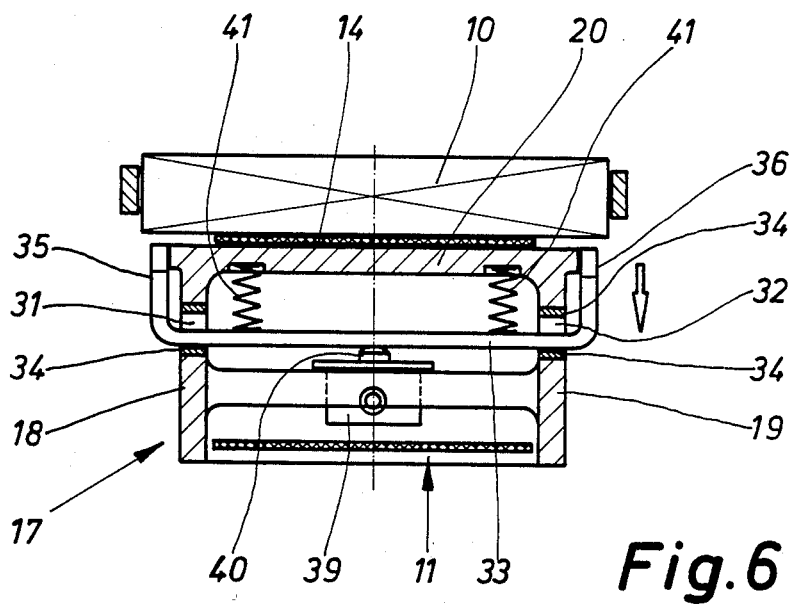
FIG. 6 shows a cross-section in the plane VI—VI with the packs resting on the pack conveyor.

In the present exemplary embodiment, the pack conveyor 11 consists of a single belt 13. The dimensions of this are such that the packs 10 resting on it in the region of one carrying side 14 project clearly beyond the conveyor belt 13 on both sides (FIG. 5 and 6). The conveyor belt 13 is guided via deflecting rollers 15 and 16. These are mounted in or on an elongate support 17 designed as a hollow-box profile with lateral supporting cheeks 18 and 19 and with an upper wall 20, on which the carrying side 14 rests.

The packs 10 are fed at distances from one another by the pack conveyor 11 to a collecting and packaging station 21. In this, pack groups 22, each consisting of several packs 10 arranged close to one another, in the present case five packs 10 per pack group 22, are formed. The particular pack group 22 received by a lifting plate 23 is lifted into a collecting chamber 24. The particular pack group 22 located at the bottom is retained by retractable supporting strips 25. As soon as the complete content of a large pack has been gathered, it is pushed out of the collecting chamber 24 in the transverse direction by a slide 26 and into a large container (folding carton) provided. The pack conveyor 11 ends at a distance in front of the collecting chamber 24.

When faults occur in the region of the collecting and packaging station 21 or in a following region, but at all events when the packs 10 supplied by the pack conveyor 11 are no longer picked up, a pack build-up, in particular a build-up series 27, forms on the pack conveyor 11, adjacent to the collecting and packaging station 21. As result of the feeding of packs 10, this build-up series 27 continues to form counter to the conveying direction until it reaches a critical length. In the present case, this is determined by means of a photocell 28 or another suitable sensing member acting transversely relative to the conveying direction and arranged directly above the pack conveyor 11. As soon as the photocell 28 is activated over a period of time by a build-up pack 10, that is to say one which is not conveyed any further, the packs 10 of the build-up series 27 are lifted off from the surface of the carrying side 14 to a slight extent. The pack conveyor 11 continues to run at the same time, without touching the underside of the packs 10.

For this purpose, adjacent to the collecting and packaging station 21, a pack lifter 29 is assigned to the pack conveyor 11. The pack lifter is designed so that a number of build-up packs 10, in particular the build-up series 27, is grasped as a whole from below and lifted, for example, approximately 5 mm.

In the exemplary embodiment illustrated, the pack lifter 29 consists of a middle supporting part 30 designed as a sheet-metal piece bent in the shape of a U (FIGS. 5 and 6). This U-shaped support part is mounted movably in the support 17 of the pack conveyor 11. For this purpose, slots 31 and 32 extending in the longitudinal direction are formed in the supporting cheeks 18 and 19. A lower web 33 of the supporting part 30 extends in these slots 31 and 32 and is thereby mounted in the support 17. The top side and under side of the slot 31–32 are covered with elastic coatings 34.

Outside the support 17, the supporting part 30 has legs 35 and 36 directed upwards. These form the actual carrying or supporting member for packs 10. During the upward movement of the pack lifter 29, the legs 35, 36 are moved on the outside past the support 17 and also past the conveyor belt 13, in such a way that the packs 10 of the build-up series 27, which project laterally beyond the support 17, are grasped in their two lateral edge regions and lifted (FIG. 5) At the same time, the supporting part 30, in the lower position, rests on the lower coating 34 and, in the upper position, against the upper coating 34 in the slot 31, 32.

Figure 2:
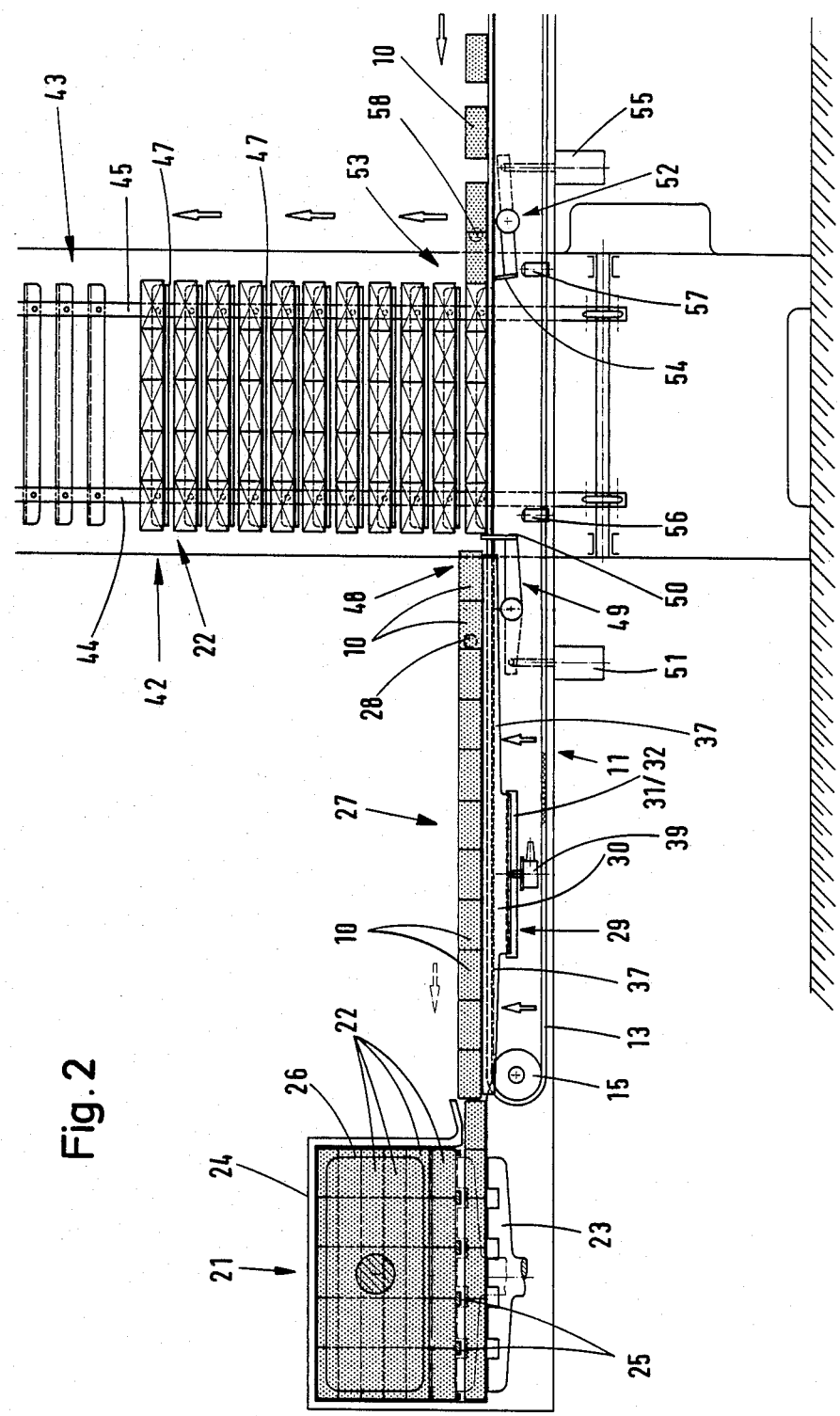
FIG. 2 shows a portion cut out from the apparatus according to FIG. 1, again in a side view and on an enlarged scale.
Figure 3:
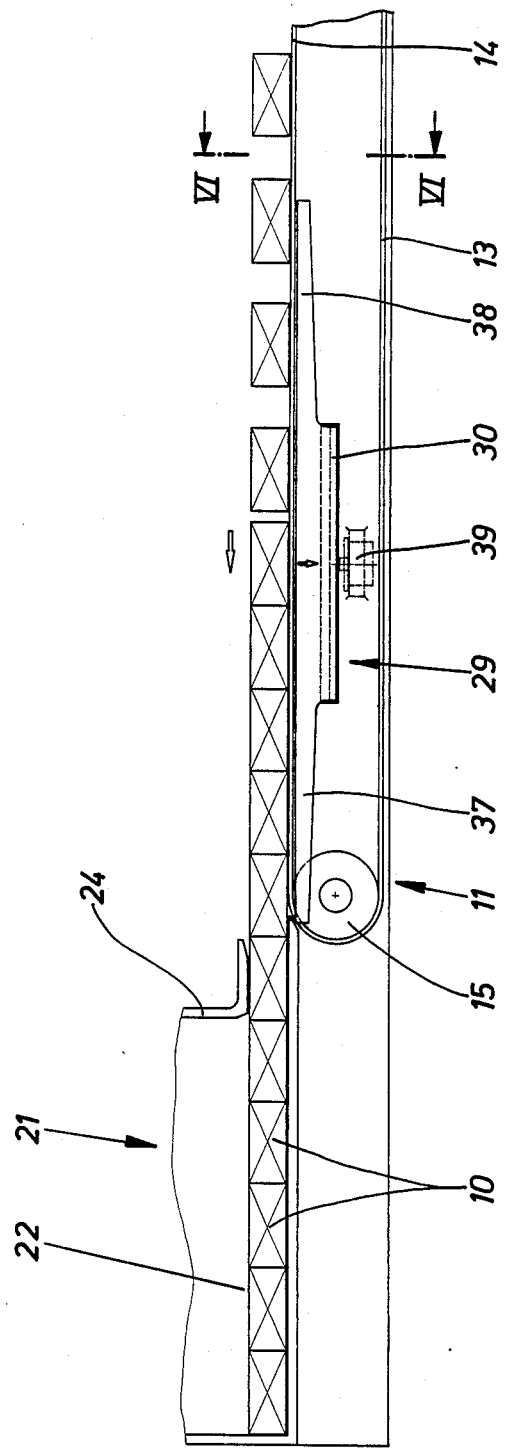
FIG. 3 shows a side view, on a further-enlarged scale, of a region of the apparatus facing the collecting and packaging
Figure 4:
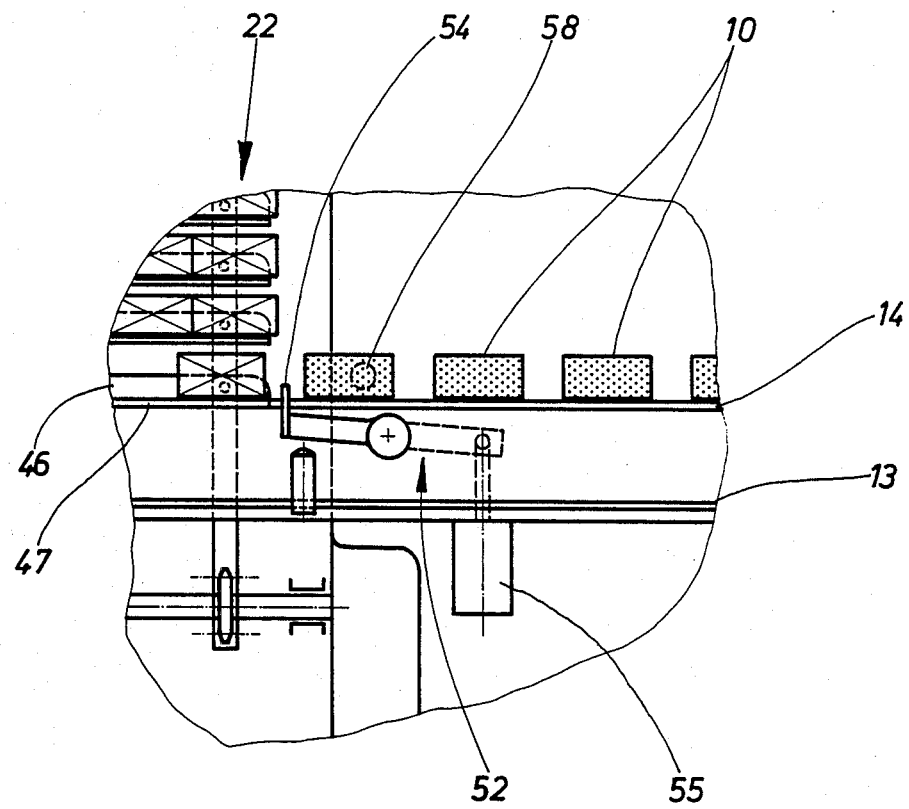
FIG. 4 shows a side view of a detail of the apparatus in the region of the pack store.

The supporting part 30 is of limited length (FIG. 2). The legs 35, 36 merge on both sides into overhanging supporting arms 37 and 38 of rectangular cross-section. These, together with the supporting part 30, form the pack lifter 29.

In the present case, a pressure-medium cylinder 39 subjected, for example, to compressed air, serves for the up-and-down movement of the pack lifter 29 or of the supporting part 30. An upward-directed ram 40 of the pressure-medium cylinder 39 acts at the centre point of the support part 30 or of the web 33 with a lifting effect on the latter.

The upward movement of the support part 30 takes place counter to restoring members, in particular counter to the load of compression springs 41. These guarantee that, when the ram 40 is retracted so as to lower the build-up series 27 on to the pack conveyor 11, the pack lifter 29 returns into the lower initial position reliably.

During the time when the build-up 27 is formed and lifted off the pack conveyor 11, packs 10 can continue to be supplied, since there is no interruption in the transfer in the region of the feed station 12. These following packs 10 are fed to a pack store 42. After the fault has been rectified and the feeding of packs 10 to the collecting and packaging station 21 continues, the packs 10 received in the pack store 42 are returned to the pack flow, that is to say on to the pack conveyor 11.

The pack store 42 is designed as a vertical store and is arranged approximately centrally in the transport zone formed by the pack conveyor 11. The pack store 42 consists of two lifting conveyors 43 which are located opposite one another on both sides of the pack conveyor 11 and which each consists of two conveyor belts 44 and 45. These are connected to one another by means of transverse pack receptacles 46, in particular angular profiles, a lower supporting leg 47 of which serves for supporting the ends of the (transversely directed) packs 10. The dimensions of the pack receptacles 46 are such that a pack group 22 composed, in the present case, of five packs 10 is held or supported on two pack receptacles 46 located opposite one another in the same horizontal plane. Because the lifting conveyors 43 on the two sides of the pack conveyor 11 are driven in synchronism with each other, the pack receptacles 46 located opposite one another and supplementing one another are moved up and down at the same time, so that the pack group 22 lying in a horizontal plane, grasped by two pack receptacles 46, is lifted off the pack conveyor 11 and transported upwards. The holding capacity of the pack store 42 is determined by its height or by the length of the lifting conveyors 43.

A stop 49 is assigned to the pack store 42 on the outlet side 48 of the latter. This stop 49 consisting of a two-armed lever is provided with a stop leg 50 which can be lifted into the path of movement of the packs 10 by means of a pressure-medium cylinder 51. In this stop position (FIG. 2), the packs 10 following on the pack conveyor 11 are packed together on the outlet side 48 of the pack store 42, in such a way that a pack group 22 is retained in a position which is correct for being received by the pack store 42. The stop 49 is actuated by the photocell 28, that is to say after the build-up series 27 has formed.

A further stop 52 is located in the region of the inlet side 53 of the pack store 42. The stop 52 is of the same design as the stop 49, that is to say with a stop leg 54 and a pressure-medium cylinder 55. To control the individual functions, sensing or monitoring members are provided in the regions of the pack store 42, in particular a photocell cell 56 in the region of the pack store 42, specifically adjacent to the outlet side 48. A further photocell 57 is located outside the region of the lifting conveyor 43 of the pack store 42, adjacent to the inlet side 53.

In the event of a fault in the region of the collecting and packaging station 21, as illustrated in FIG. 2, the stop 49 is moved into the stopping position in the way described. At the same time, the photocell 56 controls the movements of the stop 49, in such a way that the stop leg 50 penetrates into a gap formed between successive packs 10. The build-up series 27 to be lifted by the pack lifter 29 contains all the packs 10 which are conveyed through the pack store 42 and which have also already passed the stop leg 50 of the stop 49.

Because packs 10 continue to be conveyed, a further monitoring member, namely a photocell 58, acting horizontally directly above the pack conveyor 11 is activated by being covered continously. As a result, the pack store 42 is put into action, in particular being moved upwards one indexing stroke, thereby taking a pack group 22 with it. The further pack groups 22 are received in the pack store 42 in the same way.

When the collecting and packaging station 21 is ready to receive again, the pack lifter 29 is lowered again. After a certain time, the photocell 28 is exposed because packs 10 are conveyed away. As a result of this, the stop 49 is moved downwards back into the initial position. The following packs 10 are now no longer conveyed into the store 42, but fed directly to the collecting and packaging station 21.

The pack groups 22 received in the pack store 42 are now returned into the pack flow, specifically by being introduced periodically into the continuously conveyed packs 10 on the pack conveyor 11. Various alternative conveying methods are possible here. FIG. 1 shows the return cycle, when packs 10 are fed by the feed station 12 to a reduced extent. In this case, several, for example two, pack groups 22 can be extracted in succession from the pack store 42 and successively deposited, closely arranged next to one another, on the pack conveyor 11. At the same time, the packs 10 coming from the feed station 12 are retained by the stop 54 until a continuous series is formed.

When packs 10 are fed in larger quantities by feed station 12, the pack groups 22 are returned from the pack store 42 at longer time intervals. For this purpose, the packs 10 are also retained on the pack conveyor 11 for a short time in front of the pack store 42 by the stop 52 so that a pack group 22 can be deposited on the carrying side 14. Immediately after this, however, the stop 52 is moved out of position, so that the following packs 10 can come close up to the deposited pack group 22.

The pack conveyor 11 is preferably driven continuously at a constant speed. When a relatively large number of packs is being controlled, as in the alternative described above, the collecting and packaging station 21 can temporarily operate at a higher speed, that is to say receive a larger number of packs 10 per unit of time, so that the return of the packs from the pack store 42 can take place without an additional build-up effect. The stop 52 is controlled by the photocell 58 in conjunction with the photocell 57, in such a way that the stop leg 54 can be introduced into the region of a gap between particular successive packs 10.

What is claimed is:

1. Process for horizontally feeding packs to a processing station where the packs are packaged in groups each consisting of a predetermined number of packs, said packs being carried on a continuously moving horizontal pack conveyor, said process comprising the step of:
providing a lifter such that when a first group of said predetermined number of packs backs up immediately upstream of the processing station, said pack lifter temporarily lifts said first group vertically upwardly and holds it a short distance directly above the continuously running conveyor;
lowering said first group of packs onto the continuously running conveyor when there is no longer a back-up of packs;
providing a pack store further upstream of the processing station and disposed directly above packs being carried on the horizontal conveyor; and
so long as there is a pack back-up, transferring subsequent ones of said groups of packs directly vertically and upwardly into the pack store and storing the groups in a vertical stack therein.

2. Process according to claim 1 comprising the step of, when the pack back-up no longer exists, sequentially re-transferring the groups stored in the pack store directly and vertically onto the pack conveyor.

3. Process according to claim 2 comprising the step of re-transferring the stored pack groups to the pack conveyor at intervals.

4. Process according to claim 3 comprising the step of, prior to transferring the groups to the pack store, providing a stop immediately downstream of the pack store in order to form a group pack for vertical transfer into the pack store.

5. Process according to claim 4, further comprising the step of, at the time of ret-transferring a pack group from the pack store to the conveyor, temporarily blocking the conveying movement of packs at a point immediately upstream of the pack store.

6. Process according to claim 1 wherein said short distance is only approximately 5 mm.

7. Apparatus for horizontally feeding packs, carried on the upper surface of a continuously moving horizontal pack conveyor, to a processing station where they are packaged in groups each consisting of a predetermined number of packs, comprising:
detector means for detecting a back-up of at least a few groups of packs immediately upstream of the processing means;
pack lifter means, located further upstream, of the processing means and responsive to said detector means for (1) temporarily lifting backed-up packs vertically upwardly from the conveyor and holding them a short distance directly above the continuously running conveyor and (2) returning the lifted packs directly vertically to the conveyor when the back-up no longer exists; and
pack storing means disposed upstream of said pack lifter means and arranged directly vertically above said pack conveyor;
said pack storing means comprising a vertical conveyor comprising a plurality of pairs of pack receptacle means (46) for grasping pack groups from the moving conveyor and transferring the pack groups directly vertically upwardly when said back-up is detected, and for re-transferring directly vertically downwardly the pack groups to the pack conveyor when said back-up no longer exists.

8. Apparatus according to claim 7 wherein said pack lifter means (29) comprises a supporting part (30) having a pair of legs forming an essentially U-shaped cross-section, said legs being sufficiently spaced apart, so that in the lifted-up position they surround the conveyor without touching the lateral sides thereof to directly engage portions of the packs, which portions extend beyond said lateral sides, to lift the packs directly vertically upwardly from the moving conveyor.

9. Apparatus according to claim 8 further comprising:
spring means (41) for downwardly urging said support part (30); and
pressure-medium cylinder means (39) comprising ram means for moving said supporting part (30) upwardly against the urging force of said spring means.

10. Apparatus according to claim 8 comprising longitudinally-extending supporting arms (37, 38) on said legs (35, 36), respectively.

11. Apparatus according to claim 10 comprising:
support means (17) for supporting the pack conveyor;

said support means comprising lateral supporting cheeks (18, 19) having slots (31, 32); and said supporting part (30) being mounted in said slots.

12. Apparatus according to claim 7 further comprising:

stop means (49), disposed immediately downstream of said pack storing means, for blocking the horizontal movement of packs to form pack groups (22) in vertical alignment with said pair of pack receptacle means (46) of said pack storing means (42).

13. Apparatus according to claim 12 further comprising:

second stop means (52), disposed immediately upstream of said pack storing means (42), for stopping the horizontal movement of upstream packs when said pack storing means (42) is re-transferring pack groups (22) to said pack conveyor.

14. Apparatus according to claim 7 wherein said pack lifter means lifts the back-up packs only approximately 5 mm above the conveyor.

* * * * *